(12) United States Patent
Ringland et al.

(10) Patent No.: US 11,337,077 B2
(45) Date of Patent: May 17, 2022

(54) METHOD OF CHANNEL SELECTION IN A WIRELESS NETWORK

(71) Applicant: British Telecommunications Public Limited Company, London (GB)

(72) Inventors: Simon Ringland, London (GB); Francis Scahill, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 15/733,674

(22) PCT Filed: Mar. 25, 2019

(86) PCT No.: PCT/EP2019/057371
§ 371 (c)(1),
(2) Date: Sep. 28, 2020

(87) PCT Pub. No.: WO2019/185506
PCT Pub. Date: Oct. 3, 2019

(65) Prior Publication Data
US 2021/0029548 A1    Jan. 28, 2021

(30) Foreign Application Priority Data
Mar. 29, 2018   (EP) ..................................... 18165198

(51) Int. Cl.
*H04W 16/10*     (2009.01)
*H04W 24/10*     (2009.01)
(Continued)

(52) U.S. Cl.
CPC ........... *H04W 16/10* (2013.01); *H04W 24/10* (2013.01); *H04W 84/12* (2013.01); *H04W 88/08* (2013.01)

(58) Field of Classification Search
CPC ..... H04W 16/10; H04W 24/10; H04W 84/12; H04W 88/08; H04W 72/06; H04W 72/04; H04W 24/02
See application file for complete search history.

(56) References Cited

U.S. PATENT DOCUMENTS

| 8,392,712 B1 | 3/2013 | Wilson |
| 8,576,812 B2 | 11/2013 | Gray et al. |

(Continued)

FOREIGN PATENT DOCUMENTS

| CN | 103297632 A | 9/2013 |
| CN | 103583065 A | 2/2014 |

(Continued)

OTHER PUBLICATIONS

Examination Report under section 18(3) for Great Britain Application No. 1805250.6, dated Jul. 20, 2020, 3 pages.

(Continued)

*Primary Examiner* — Chuong A Ngo
(74) *Attorney, Agent, or Firm* — Patterson Thuente IP (57) ABSTRACT

There is disclosed a method of selecting a channel for wireless communication in a network, including communicating data over a first communication channel between an access point and a client device for a first time period, during the first time period, obtaining a first performance measurement indicative of the performance of the first channel, communicating data over a second communication channel between the access point and the client device for a second time period, during the second time period, obtaining a second performance measurement indicative of the performance of the second channel, ranking the first and second channels in order of performance taking the first and second (Continued)

performance measurements into account when doing so, selecting an operating channel using the outcome of the ranking.

16 Claims, 3 Drawing Sheets

(51) Int. Cl.
H04W 84/12 (2009.01)
H04W 88/08 (2009.01)

(56) References Cited

U.S. PATENT DOCUMENTS

| | | | |
|---|---|---|---|
| 8,649,418 | B1 | 2/2014 | Negus et al. |
| 8,805,374 | B2 | 8/2014 | Zhu et al. |
| 9,319,959 | B2 | 4/2016 | White et al. |
| 9,420,510 | B1 | 8/2016 | Surmay et al. |
| 9,775,164 | B2 | 9/2017 | Amini et al. |
| 9,853,899 | B2 | 12/2017 | Ringland |
| 9,883,436 | B2 | 1/2018 | Brown et al. |
| 10,015,686 | B2 | 7/2018 | Townend et al. |
| 10,070,345 | B2 | 9/2018 | Townend |
| 10,075,961 | B2 | 9/2018 | Nokovee |
| 10,123,241 | B2 | 11/2018 | Brown et al. |
| 10,142,919 | B2 | 11/2018 | Brown et al. |
| 10,225,775 | B2 | 3/2019 | Townend |
| 10,231,177 | B2 | 3/2019 | Ringland et al. |
| 10,356,706 | B2 | 7/2019 | Ringland et al. |
| 2001/0055285 | A1 | 12/2001 | Tomoike |
| 2002/0165563 | A1 | 11/2002 | Grant et al. |
| 2002/0181417 | A1 | 12/2002 | Malhotra et al. |
| 2003/0123420 | A1 | 7/2003 | Sherlock |
| 2003/0134638 | A1 | 7/2003 | Sundar et al. |
| 2003/0161341 | A1 | 8/2003 | Wu et al. |
| 2004/0165563 | A1 | 8/2004 | Hsu et al. |
| 2005/0003857 | A1 | 1/2005 | Sylvain |
| 2005/0047343 | A1 | 3/2005 | Sharony et al. |
| 2005/0059400 | A1 | 3/2005 | Jagadeesan et al. |
| 2005/0090259 | A1 | 4/2005 | Jain et al. |
| 2005/0271009 | A1 | 12/2005 | Shirakabe et al. |
| 2005/0271021 | A1 | 12/2005 | Alemany et al. |
| 2006/0092883 | A1 | 5/2006 | Lee et al. |
| 2006/0111112 | A1 | 5/2006 | Maveddat |
| 2006/0116127 | A1 | 6/2006 | Wilhoite et al. |
| 2006/0146709 | A1 | 7/2006 | Ginzburg |
| 2006/0217147 | A1 | 9/2006 | Olvera-Hernandez et al. |
| 2006/0240828 | A1 | 10/2006 | Jain et al. |
| 2007/0008928 | A1 | 1/2007 | Kezys |
| 2007/0105544 | A1 | 5/2007 | Veres et al. |
| 2007/0124478 | A1 | 5/2007 | Abdelhamid et al. |
| 2007/0291711 | A1 | 12/2007 | Welch et al. |
| 2008/0008140 | A1 | 1/2008 | Forssell |
| 2008/0049738 | A1 | 2/2008 | Joung et al. |
| 2008/0080387 | A1 | 4/2008 | Wang et al. |
| 2008/0080388 | A1 | 4/2008 | Dean et al. |
| 2008/0117836 | A1 | 5/2008 | Savoor et al. |
| 2008/0151751 | A1 | 6/2008 | Ponnuswamy et al. |
| 2008/0159207 | A1 | 7/2008 | Levine et al. |
| 2008/0253314 | A1 | 10/2008 | Stephenson et al. |
| 2008/0291915 | A1 | 11/2008 | Foschiano |
| 2009/0010222 | A1 | 1/2009 | Jechoux |
| 2009/0046655 | A1 | 2/2009 | Zhao et al. |
| 2009/0116443 | A1 | 5/2009 | Walker et al. |
| 2009/0154363 | A1 | 6/2009 | Stephens |
| 2009/0215438 | A1 | 8/2009 | Mittal et al. |
| 2009/0286534 | A1 | 11/2009 | Garg et al. |
| 2009/0310501 | A1 | 12/2009 | Catovic et al. |
| 2010/0003921 | A1 | 1/2010 | Godlewski et al. |
| 2010/0080196 | A1 | 4/2010 | Ho et al. |
| 2010/0255794 | A1 | 10/2010 | Agnew |
| 2011/0002466 | A1 | 1/2011 | Kwak et al. |
| 2011/0096739 | A1* | 4/2011 | Heidari ............... H04W 72/085 370/329 |
| 2011/0243013 | A1 | 10/2011 | Lee et al. |
| 2011/0292822 | A1 | 12/2011 | Wood et al. |
| 2011/0305180 | A1 | 12/2011 | Oesterling et al. |
| 2012/0060198 | A1 | 3/2012 | Tremblay et al. |
| 2012/0170548 | A1 | 7/2012 | Rajagopalan et al. |
| 2012/0224484 | A1 | 9/2012 | Babiarz et al. |
| 2012/0252510 | A1 | 10/2012 | Wang et al. |
| 2012/0269182 | A1 | 10/2012 | Walker |
| 2012/0314571 | A1 | 12/2012 | Forssell |
| 2012/0315905 | A1 | 12/2012 | Zhu et al. |
| 2012/0324100 | A1 | 12/2012 | Tomici et al. |
| 2013/0053023 | A1 | 2/2013 | Meredith et al. |
| 2013/0102313 | A1 | 4/2013 | Tinnakornsrisuphap et al. |
| 2013/0121145 | A1 | 5/2013 | Draznin et al. |
| 2013/0157688 | A1 | 6/2013 | Kateley et al. |
| 2013/0294263 | A1 | 11/2013 | Haga et al. |
| 2013/0295989 | A1 | 11/2013 | Smadi et al. |
| 2013/0324125 | A1 | 12/2013 | Bachmann et al. |
| 2014/0118462 | A1 | 5/2014 | Zhao et al. |
| 2014/0177600 | A1 | 6/2014 | Tsai et al. |
| 2014/0258509 | A1 | 9/2014 | Raghuraman et al. |
| 2014/0313888 | A1 | 10/2014 | Linkola et al. |
| 2014/0315536 | A1 | 10/2014 | Chow et al. |
| 2014/0321298 | A1 | 10/2014 | Chow et al. |
| 2014/0323087 | A1 | 10/2014 | Huang et al. |
| 2014/0334465 | A1 | 11/2014 | Lee et al. |
| 2015/0051872 | A1 | 2/2015 | Arora et al. |
| 2015/0071166 | A1 | 3/2015 | Malhotra et al. |
| 2015/0117209 | A1 | 4/2015 | Lee et al. |
| 2015/0131619 | A1 | 5/2015 | Zhu et al. |
| 2015/0181416 | A1 | 6/2015 | Dominguez Romero et al. |
| 2015/0189556 | A1 | 7/2015 | Sidhu et al. |
| 2015/0201363 | A1 | 7/2015 | Lundqvist et al. |
| 2015/0215832 | A1 | 7/2015 | Fitzpatrick |
| 2015/0282013 | A1 | 10/2015 | Kim et al. |
| 2015/0312857 | A1 | 10/2015 | Kim et al. |
| 2016/0043953 | A1 | 2/2016 | Ringland et al. |
| 2016/0044568 | A1 | 2/2016 | White et al. |
| 2016/0057290 | A1 | 2/2016 | Punwani et al. |
| 2016/0057676 | A1 | 2/2016 | White et al. |
| 2016/0066227 | A1 | 3/2016 | Townend |
| 2016/0073286 | A1 | 3/2016 | Wang et al. |
| 2016/0095050 | A1 | 3/2016 | Lindheimer et al. |
| 2016/0095129 | A1 | 3/2016 | Hoyhtya et al. |
| 2016/0157239 | A1 | 6/2016 | Kalderen et al. |
| 2016/0165508 | A1 | 6/2016 | Jin |
| 2016/0165518 | A1 | 6/2016 | Keller et al. |
| 2016/0165532 | A1 | 6/2016 | Nagasaka et al. |
| 2016/0174110 | A1 | 6/2016 | Sharma et al. |
| 2016/0183085 | A1 | 6/2016 | Yerrabommanahalli et al. |
| 2016/0295385 | A1 | 10/2016 | Wang et al. |
| 2016/0316425 | A1 | 10/2016 | Cili et al. |
| 2016/0337904 | A1 | 11/2016 | Hsu et al. |
| 2016/0345256 | A1 | 11/2016 | Niranjan et al. |
| 2016/0347298 | A1 | 12/2016 | Jung |
| 2016/0373989 | A1 | 12/2016 | Tinnakornsrisuphap et al. |
| 2017/0006479 | A1* | 1/2017 | Smith ............... H04W 24/02 |
| 2017/0006504 | A1 | 1/2017 | Townend et al. |
| 2017/0111807 | A1 | 4/2017 | Townend et al. |
| 2017/0111813 | A1 | 4/2017 | Townend et al. |
| 2017/0118091 | A1 | 4/2017 | Townend et al. |
| 2017/0134261 | A1 | 5/2017 | Seo et al. |
| 2017/0164195 | A1 | 6/2017 | Stammers et al. |
| 2017/0181059 | A1 | 6/2017 | Townend et al. |
| 2017/0272995 | A1 | 9/2017 | Kim et al. |
| 2017/0289894 | A1 | 10/2017 | Palm et al. |
| 2017/0347298 | A1 | 11/2017 | Brown et al. |
| 2017/0359732 | A1 | 12/2017 | Ganu et al. |
| 2017/0374597 | A1 | 12/2017 | Ray et al. |
| 2018/0091967 | A1 | 3/2018 | Gupta |
| 2018/0092140 | A1 | 3/2018 | Dong et al. |
| 2018/0124630 | A1 | 5/2018 | Ringland et al. |
| 2018/0139692 | A1 | 5/2018 | Liu et al. |
| 2018/0254979 | A1 | 9/2018 | Scahill et al. |
| 2018/0270677 | A1 | 9/2018 | Brisebois et al. |
| 2019/0014519 | A1 | 1/2019 | Brown et al. |
| 2019/0037339 | A1 | 1/2019 | Liu et al. |
| 2019/0069328 | A1 | 2/2019 | Sharma |
| 2019/0116540 | A1 | 4/2019 | Faus Gregori |
| 2019/0124559 | A1 | 4/2019 | Brown et al. |

(56) References Cited

U.S. PATENT DOCUMENTS

| | | | |
|---|---|---|---|
| 2019/0230132 | A1 | 7/2019 | Brown et al. |
| 2020/0107255 | A1 | 4/2020 | Cuevas Ramirez |
| 2020/0236595 | A1 | 7/2020 | Cuevas Ramirez et al. |

FOREIGN PATENT DOCUMENTS

| | | | |
|---|---|---|---|
| CN | 104684039 A | 6/2015 |
| CN | 105554855 A | 5/2016 |
| CN | 105722060 A | 6/2016 |
| CN | 105917707 A | 8/2016 |
| CN | 106028409 A | 10/2016 |
| CN | 106134252 A | 11/2016 |
| CN | 106161802 A | 11/2016 |
| CN | 106358254 A | 1/2017 |
| EP | 1096730 A1 | 5/2001 |
| EP | 2424281 A1 | 2/2012 |
| EP | 2477435 A1 | 7/2012 |
| EP | 2482490 A1 | 8/2012 |
| EP | 2530875 A1 | 12/2012 |
| EP | 2632071 A1 | 8/2013 |
| EP | 2680494 A1 | 1/2014 |
| EP | 2720409 A1 | 4/2014 |
| EP | 2900016 A1 | 7/2015 |
| EP | 2925056 A2 | 9/2015 |
| EP | 2025106 B9 | 7/2016 |
| JP | 2017130777 A | 7/2017 |
| WO | WO-2004102919 A1 | 11/2004 |
| WO | WO-2006138019 A2 | 12/2006 |
| WO | WO-2007076147 A2 | 7/2007 |
| WO | WO-2008008990 A2 | 1/2008 |
| WO | WO-2009143196 A2 | 11/2009 |
| WO | WO-2012145706 A1 | 10/2012 |
| WO | WO-2015150745 A1 | 10/2015 |
| WO | WO-2016004968 A1 | 1/2016 |
| WO | WO-2016032615 A1 | 3/2016 |
| WO | WO-2016156439 A1 | 10/2016 |
| WO | WO-2017114932 A1 | 7/2017 |
| WO | WO-2017167694 A1 | 10/2017 |
| WO | WO-2017167701 A1 | 10/2017 |
| WO | WO-2018002130 A1 | 1/2018 |
| WO | WO-2018178241 A1 | 10/2018 |
| WO | WO-2018178293 A1 | 10/2018 |
| WO | WO-2018178294 A1 | 10/2018 |
| WO | WO-2018234037 A1 | 12/2018 |
| WO | WO-2018234038 A1 | 12/2018 |

OTHER PUBLICATIONS

Extended European Search Report for Application No. 18165198.5, dated Sep. 14, 2018, 7 pages.
International Search Report and Written Opinion for Application No. PCT/EP2019/057371, dated May 21, 2019, 12 pages.
Kajita S., et al., "A Channel Selection Strategy for WLAN in Urban Areas by Regression Analysis," IEEE, 10th International Conference on Wireless and Mobile Computing, Networking and Communication, 2014, pp. 642-647.
Samsudin A.T., et al., "Least Congested Channel Recommendation for Uncoordinated Access Point," ICACT2017, Feb. 19-22, 2017, pp. 237-243.
3 GPP TR 37.834 V0.4.0 (Aug. 2013), "3rd Generation Partnership Project; Technical Specification Group Radio Access Network; Study on WLAN/3GPP Radio Interworking," (Release 12), May 15, 2014, XP050816244, 14 pages.
3GPP TS 22.173 V7.3.0 (Mar. 2007) "3rd Generation Partnership Project (3GPP); Technical Specification Group Services and System Aspects; IP Multimedia Core Network Subsystem (IMS) Multimedia Telephony Service and supplementary services Stage 1; (Release 7)," 10 pages.
3GPP TS 23.402 V13.4.0 (Dec. 2015) "3rd Generation Partnership Project; Technical Specification Group Services and System Aspects; Architecture enhancements for non-3GPP accesses (Release 13)," 650 Route des Lucioles—Sophia Antipolis Valbonne, Dec. 2015, 298 pages.
Alcatel-Lucent, "Policy Based Terminal Triggered, ANDSF Decided Access Selection," 3GPP draft, S2-081355_ANDSF discussion, Mobile Competence Centre, Athens, Greece, vol. SA WG2, Feb. 8, 2008, 5 pages.
Alcatel-Lucent, "Policy Based Terminal Triggered, ANDSF Decided Access Selection," 3GPP draft, S2-081658_ANDSF discussion, 3rd Generation Partnership Project (3GPP), Mobile Competence Centre, 650, Route Des Lucioles, F-06921 Sophia Antipolis Cedex, France, vol. SA WG2, Athens, XP050263998, Feb. 16, 2008, 6 pages.
Bhadane D.Y, et al., "Improving Fast and Smooth Handoff in IEEE 802.11 Wireless Networks," IJRIM, ISSN: 2231-4334, Feb. 2012, vol. 2 (2), 9 pages.
Broadband Forum, "Technical Report TR-069 CPE WAN Management Protocol," issue: 1 Amendment 5, Nov. 2013, CWMP Version: 1.4, 228 pages.
"BT Wi-Fi," Retrieved from https://www.bt.com/btfon, Sep. 28, 2015, 2 pages.
Claise E. B., "CISCO Systems NetFlow Services Export Version 9," retrieved on Feb. 22, 2018, from https://www.ietf.org/rfc/rfc3954.txt, Oct. 9, 2004, 29 pages.
Combined Search and Examination Report for Great Britain Application No. 1710043.9, dated Nov. 20, 2017, 5 pages.
Combined Search and Examination Report under Sections 17 and 18(3) for Great Britain Application No. 1705248.1, dated Aug. 25, 2017, 6 pages.
Combined Search and Examination Report under Sections 17 and 18(3) for Great Britain Application No. GB1705257.2, dated Aug. 17, 2017, 2 pages.
Combined Search and Examination Report under Sections 17 and 18(3) for Great Britain Application No. GB1705262.2, dated Oct. 12, 2017, 4 pages.
Communication pursuant to Article 94(3) EPC For European Application No. 18713692.4, dated Dec. 22, 2020, 7 pages.
"Distributed Coordination Function," Retrieved from http://en.wikipedia.org/wiki/Distributed.sub.--Coordination Function, Sep. 28, 2015, 2 pages.
Ericsson, "Wi-Fi calling—extending the reach of VoLTE to Wi-Fi," Jan. 30, 2015, XP055251865, retrieved on Dec. 26, 2018, 5 pages.
Eronen E., "RFC 4555—IKEv2 Mobility and Multihoming Protocol (MOBIKE)," Nokia, Network Working Group Request for Comments, 4555, Category, Standards Track, XP055299729, Jun. 2006, 34 pages.
European Search Report for Application No. 17177601.6, dated Nov. 17, 2017, 12 pages.
Examination Report for Great Britain Application No. 1710046.2, dated Sep. 26, 2019, 3 pages.
Examination Report under section 18(3) for Great Britain Application No. 1805260.5, dated Jul. 7, 2020, 3 pages.
Examination Report under section 18(3) for Great Britain Application No. 2013247.8, dated Oct. 13, 2021, 7 pages.
Examination Report for Great Britain Application No. 1710043.9, dated Sep. 25, 2019, 2 pages.
Extended European Search Report for Application No. 13250034.9, dated Sep. 12, 2013, 9 pages.
Extended European Search Report for Application No. 13250043.0, dated Nov. 7, 2013, 5 pages.
Extended European Search Report for Application No. 17164395.0, dated Sep. 22, 2017, 17 pages.
Extended European Search Report for Application No. 18165202.5, dated Sep. 17, 2018, 10 pages.
http://unixhelp.ed.ac.uk/CGI/man-cgi?tc+8, 2 pages.
Huawei: "How solutions 1,2 and 3 work without ANDSF," RAN WG2 #83bis, R2-133444, Ljubljana, Slovenia; Oct. 7-11, 2013, XP050719049, 5 pages.
"IEEE 802.11 e-2005," Retrieved from http://en.wikipedia.org/wiki/IEEE.sub.--802.11e-2005, Sep. 28, 2015, 4 pages.
International Preliminary Report on Patentability for Application No. PCT/GB2015/050908, dated Oct. 13, 2016, 8 pages.
International Preliminary Report on Patentability for Application No. PCT/EP2016/082894, dated Jul. 3, 2018, 9 pages.
International Preliminary Report on Patentability for Application No. PCT/EP2017/057204, dated Oct. 2, 2018, 6 pages.

(56) References Cited

OTHER PUBLICATIONS

International Preliminary Report on Patentability for Application No. PCT/EP2017/057225, dated Oct. 2, 2018, 10 pages.
International Preliminary Report on Patentability for Application No. PCT/EP2018/058085, dated Oct. 10, 2019, 17 pages.
International Preliminary Report on Patentability for Application No. PCT/EP2018/058199, dated Oct. 10, 2019, 16 pages.
International Preliminary Report on Patentability for Application No. PCT/EP2018/058202, dated Oct. 10, 2019, 9 pages.
International Preliminary Reporton Patentability for Application No. PCT/GB2014/000111, dated Oct. 8, 2015, 9 pages.
International Preliminary Report on Patentability for Application No. PCT/GB2014/000122, dated Oct. 8, 2015, 6 pages.
International Preliminary Report on Patentability for Application No. PCT/GB2014/053705, dated Jul. 14, 2016, 12 pages.
International Preliminary Report on Patentability for Application No. PCT/GB2015/050906, dated Oct. 13, 2016, 9 pages.
International Preliminary Report on Patentability for Application. PCT/EP2018/064879, dated Jan. 2, 2020, 13 pages.
International Preliminary Report on Patentability for Application No. PCT/EP2018/064878, dated Jan. 2, 2020, 12 pages.
International Preliminary Report on Patentability for PCT Application No. PCT/EP2017/065977 dated Jan. 1, 2019, 8 pages.
International Preliminary Report on Patentability for Application No. PCT/GB2015/050907, dated Oct. 13, 2016, 8 pages.
International Search Report and Written Opinion for Application No. PCT/EP2016/072803, dated Dec. 14, 2016, 11 pages.
International Search Report and Written Opinion for Application No. PCT/EP2016/082894, dated Feb. 17, 2017, 12 pages.
International Search Report and Written Opinion for Application No. PCT/EP2017/057204, dated Apr. 21, 2017, 9 pages.
International Search Report and Written Opinion for Application No. PCT/EP2017/057225, dated May 18, 2017, 13 pages.
International Search Report and Written Opinion for Application No. PCT/EP2018/058085, dated May 17, 2018, 19 pages.
International Search Report and Written Opinion for Application No. PCT/EP2018/064878, dated Jul. 3, 2018, 14 pages.
International Search Report and Written Opinion for Application No. PCT/EP2018/064879, dated Jul. 6, 2018, 17 pages.
International Search Report and Written Opinion for Application No. PCT/EP2019/057375 dated May 21, 2019, 15 pages.
International Search Report and Written Opinion for Application No. PCT/GB2015/050907, dated Jun. 3, 2015, 10 pages.
International Search Report and Written Opinion for Application No. PCT/GB2015/050908, dated Jun. 15, 2015, 10 pages.
International Search Report and Written Opinion for PCT Application No. PCT/EP2017/065977 dated Sep. 6, 2017, 10 pages.
International Search Report for Application No. PCT/EP2018/058199, dated May 17, 2018, 18 pages.
International Search Report for Application No. PCT/EP2018/058202, dated May 2, 2018, 11 pages.
International Search Report for Application No. PCT/GB2014/000111, dated Jun. 6, 2014, 4 pages.
International Search Report for Application No. PCT/GB2014/000122, dated May 6, 2014, 3 pages.
International Search Report for Application No. PCT/GB2014/000123, dated May 6, 2014, 4 pages.
International Search Report for Application No. PCT/GB2014/053705, dated Mar. 9, 2015, 3 pages.
International Search Report for Application No. PCT/GB2015/050906 dated Jun. 18, 2015, 4 pages.
International Telecommunications Union, "G.hn Management and Diagnostics Specifications," Study Period 2009-2012, Study Group 15—Contribution 807, May 2010, 12 pages.
Jiang B.L., et al., "Proportional Fairness in Wireless LANs and Ad Hoc Networks," IEEE Wireless Communications and Networking Conference, 2005, 6 pages.
Kaufman, et al., "RFC 7296—Internet Key Exchange Protocol Version 2 (KIEv2)," XP055243756, Oct. 1, 2014, retrieved from the internet http://tools.ietf.org/html/rfc7296#page-58; on Dec. 26, 2018, 143 pages.
Leith D.J., et al., "A Self-Managed Distributed Channel Selection Algorithm for WLANs," Modeling and Optimization in Mobile, Ad Hoc and Wireless Networks, 2006 4th International Symposium on Boston, MA, USA, Piscataway, NJ, USA, IEEE, XP010933071, DOI: 10.1109/WIOPT.2006.1666484 ISBN: 978-0-7803-9549-7, Apr. 3, 2006, 9 pages.
Murty R., et al., "Dyson: An Architecture for Extensible Wireless LANs," Microsoft Research, Harvard University, 14 pages.
Mustafa N., et al., "Pre-Scanning and Dynamic Caching for Fast Handoff at MAC Layer in IEEE 802.11 Wireless LANs," NUST University Rawalpindi, Pakistan, 2005, 8 pages.
Nogueira J., et al., "Channel Selection Relying on Probabilistic Adjacent Channel Interference Analysis and Pattern Recognition," Wireless Personal Communication (2016), Jul. 30, 2015, vol. 86(3), pp. 1333-1357.
Office Action For Chinese Application No. 201880021005.9, dated Jan. 29, 2021, 14 pages.
Office Action For Chinese Application No. 201880022391.3, dated Feb. 26, 2021, 13 pages.
Office Action For Chinese Application No. 201880022734.6, dated Feb. 2, 2021, 7 pages.
Ong E.H., et al., "A Unified QoS-inspired Load Optimization Framework for Multiple Access Points Based Wireless LANs", Wireless Communications and Networking Conference, 2009, WCNC 2009. IEEE, Apr. 5-8, 2009, pp. 1-6.
RAN2 "Reply-LS on "Subscriber Type" Indication via S1," 3GPP TSG RAN WG3 Meeting #59, Feb. 15, 2008, R2-075458, 1 page.
Romdhani L., et al., "Adaptive edcf: Enhanced Service Differentiation for IEEE 802.11 Wireless Ad-Hoc Networks," 2003 IEEE Wireless Communications and Networking Conference Record, Mar. 16-20, 2003, 6 pages.
S2-080718, "Subscriber Type on S1," 3GPP TSG SA WG2 Meeting #62 Marina Del Rey, USA, Jan. 14-18, 2008, 2 pages.
Sauter M., "Wireless Local Area Network (WLAN) in: Communication Systems for the Mobile information Society," John Wiley & Sons, Ltd, Chichester, UK, XP055140319, DoI: 10.1092/9780470933210, Jul. 14, 2006, pp. 217-248.
Search Report for Great Britain Application No. 1710046.2, dated Nov. 20, 2017, 4 pages.
Server Fault, "Huge Outgoing Traffic on Windows Azure," retrieved on Sep. 28, 2015, 2 pages.
Siddiqui F., et al., "Mobility Management Across Hybrid Wireless Networks: Trends and Challenges," Elsevier, retrieved from www.sciencedirect.com on Oct. 6, 2005, Computer Communications, vol. 29, 2006, 3 pages.
Veres A., et al., "Supporting Service Differentiation in Wireless Packet Networks Using Distributed Control," IEEE Journal on Selected Areas in Communications, IEEE Service Center, Oct. 1, 2001, vol. 19 (10), 13 pages.
Wikipedia, "IEEE 802.11e-2005," retrieved on Sep. 28, 2015, 4 pages.
Written Opinion for Application No. PCT/GB2014/000111, dated Jun. 6, 2014, 7 pages.
Written Opinion for Application No. PCT/GB2014/000122, dated May 6, 2014, 4 pages.
Written Opinion for Application No. PCT/GB2014/053705, dated Mar. 9, 2015, 10 pages.
Written Opinion for Application No. PCT/GB2015/050906 dated Jun. 18, 2015, 7 pages.
Application and File History for U.S. Appl. No. 15/733,675, filed Sep. 28, 2020, inventors: Ringland et al.

* cited by examiner

METHOD OF CHANNEL SELECTION IN A WIRELESS NETWORK

PRIORITY CLAIM

The present application is a National Phase entry of PCT Application No. PCT/EP2019/057371, filed Mar. 25, 2019, which claims priority from EP Patent Application No. 18165198.5, filed Mar. 29, 2018, each of which is hereby fully incorporated herein by reference.

TECHNICAL FIELD

This disclosure relates generally to wireless communication networks and more particularly to optimizing signal quality between network devices via channel selection.

BACKGROUND

It is well known that various factors reduce the quality of signals transmitted between an access point and a client device in a network. One such performance-reducing factor is noise. Another is contention, i.e., the existence in the locality of access points of other networks which use the same frequency band for communication and therefore contend with the access point at issue for airtime.

One way of minimizing the effect of such performance-reducing factors is through judicious selection of the operating channel that the network uses. This task is made more complicated by the fact that the magnitude of the performance-reducing factors can vary with time. It is desirable to find an improved method of channel selection for minimizing reductions in signal quality.

SUMMARY

According to a first aspect of the disclosure there is provided a method of selecting a channel for wireless communication in a WLAN, the method comprising communicating data over a first communication channel between an access point and a client device for a first time period; during the first time period, obtaining a first performance measurement indicative of the performance of the first channel; communicating data over a second communication channel between the access point and the client device for a second time period; during the second time period, obtaining a second performance measurement indicative of the performance of the second channel; ranking the first and second channels in order of performance taking the first and second performance measurements into account when doing so; and selecting an operating channel using the outcome of the ranking.

Some known WLANs having an access point with a single radio, check the performance of candidate operating channels by pausing communication on the current operating channel and performing a very brief performance measurement of each of the other channels. Embodiments of the disclosure are advantageous over such systems because, for example, there is no need to pause communication in order to measure the performance of a channel. Furthermore, embodiments provide for a method to be performed in which performance data can collected over a longer period than in known systems, enabling a greater quantity of performance data to be collected.

Communicating data over the first channel may comprise sending and receiving data over the first channel. Communicating data over the second channel may comprise sending and receiving data over the second channel.

Sending and receiving data over the first channel and sending and receiving data over the second channel may both be performed using a radio and can be performed using the same radio. The first time period may be equal to the second time period. The first time period may be longer than one minute and may be longer than one day. The first time period may be one week.

The second time period may begin immediately after the first time period ends. The method may comprise obtaining a plurality of first performance measurements during the first time period. The method may comprise obtaining a plurality of second performance measurements during the second time period. Ranking the first and second channels in order of performance may include using the plurality of first performance measurements to generate a first performance value for the first channel and may further include using the plurality of second performance measurements to generate a second performance value for the second channel. The ranking may further include comparing the generated first performance value with the generated second performance value.

The method may further comprise dividing the first time period into sub-periods and, for each sub-period, calculating the average value of two or more first performance measurements which were obtained during that sub-period. The first performance value may be generated taking into account the calculated average values. The method may further comprise dividing the second time period into sub-periods and, for each sub-period, calculating the average value of two or more second performance measurements which were obtained during that sub-period. The second performance value may be generated taking into account the calculated average values.

The calculated average values of the first and/or second performance measurements may be recorded in a data store. The generated first and/or second performance values may be generated using the most recently stored average first and/or second performance measurements. Therefore a new value of the first and/or second performance values may be generated every time a new average of the first and/or second performance measurements is stored in the data store. The generated first and/or second performance values may be stored in the data store. The data store may be located in the access point. The sub-periods may be of uniform duration and may be greater than or equal to 30 seconds and less than or equal 120 seconds and are for example, 60 seconds.

If the generated first performance value indicates that the performance of the first channel has fallen below an unworkability threshold, the first channel may be replaced as the operating channel before the end of the first time period and, for example, immediately.

The one or more first and/or second performance measurements may include one or more measurements of the noise on the channel. Noise on the channel may include interference from sources including but not limited to microwave ovens and analogue TV senders. The one or more first and/or second performance measurements may include one or more measurements of the contention level on the channel. The contention level may be a measure of the amount of contending neighboring Wi-Fi traffic that is operating on the channel. In some embodiments the one or more first and/or second performance measurements include one or more measurements of the noise on the channel and one or more measurements of the contention level on the channel.

The first performance value may be generated using a noise score which may be the percentage of averaged noise measurement values that are above a noise threshold in the first time period. Alternatively or in addition, the first performance value may be generated using a contention score which may be the percentage of averaged contention measurement values that are above a contention threshold in the first time period. Alternatively or in addition, the first performance value may be generated using a no measurement score which may be the percentage of the first time period for which measurements have not been made. Generating the first performance value may include determining which is the largest of the noise score, the contention score and the no measurement score. The first performance value may be calculated as "100 minus the largest of the noise score, the contention score and the no measurement score".

The averaged first and/or second performance measurements may be recorded in a data store. The generated first and/or second performance values may be recorded in the data store. The data store may be located in the access point.

In some embodiments, in addition to the first and second channels there are one or more further communication channels. In these embodiments, the method may include sending and receiving data over the one or more further communication channels between the access point and the client device for a further time period. The method may further comprise obtaining, from the one or more further channels, one or more further performance measurements indicative of the performance of the one or more further channels. The method may further include ranking the first, second and one or more further channels in order of performance taking the first and second and one or more further performance measurements into account when doing so. Any of the above relating to the first and/or second channels may also apply to the one or more further channels, mutatis mutandis. In some embodiments there is one further channel. In other embodiments there are 11 further channels. Other numbers of further channels are possible, depending on factors including the regulatory domain and operating band used. The first, second and one or more further channels may each use a range of frequencies. The frequencies may or may not overlap.

Selecting an operating channel using the outcome of the ranking step may involve excluding one or more of the lowest ranked channels from use as the operating channel. In some embodiments it is the single lowest ranked channel that is excluded from use as the operating channel. If the lowest ranked channel is the only channel available for use as the operating channel, it may not be excluded for use as the operating channel.

The method may include constructing a list of channels upon which the method is to be performed. The list of channels may be recorded in the data store. The performance value corresponding to each channel may be recorded in association with that channel in the list of channels. The ranking may further comprise comparing the performance value of one or more channels with the performance value of a channel that has been excluded from use as an operating channel. This comparison may use the last recorded performance value for the channel that has been excluded from use as an operating channel. A channel that has been excluded from use as an operating channel may be made available for use again as an operating channel if, after the ranking it is ranked higher than some, or in some embodiments all of the other channels.

According to a second aspect of the disclosure there is provided an access point for a wireless communication network, the access point comprising a transceiver adapted to communicate data between the access point and a client device over a first communication channel for a first time period, the transceiver being further adapted to communicate data between the access point and the client device over a second communication channel for a second time period; a performance measurer adapted to measure the performance of the first channel during the first time period and further adapted to measure the performance of the second channel during the second time period; channel ranking means adapted to rank the first and second channel using the measurements made by the performance measurer; and a channel selector adapted to use an output of the channel ranking means to select an operating channel for the access point.

The transceiver may be adapted to transmit and receive data between the access point and a client device over the first communication channel for the first time period. The transceiver may be adapted to transmit and receive data between the access point and a client device over the second communication channel for the second time period.

The transceiver may be a radio. The access point may be provided with a single radio. The performance measurer may be adapted to measure the noise level and contention level on the channel.

The features defined above in relation to the first aspect of the disclosure are also applicable to the second aspect of the disclosure.

BRIEF DESCRIPTION OF FIGURES

A specific embodiment of the disclosure will now be described, for illustration only, with reference to the appended drawings, in which.

DETAILED DESCRIPTION

Figure 1:
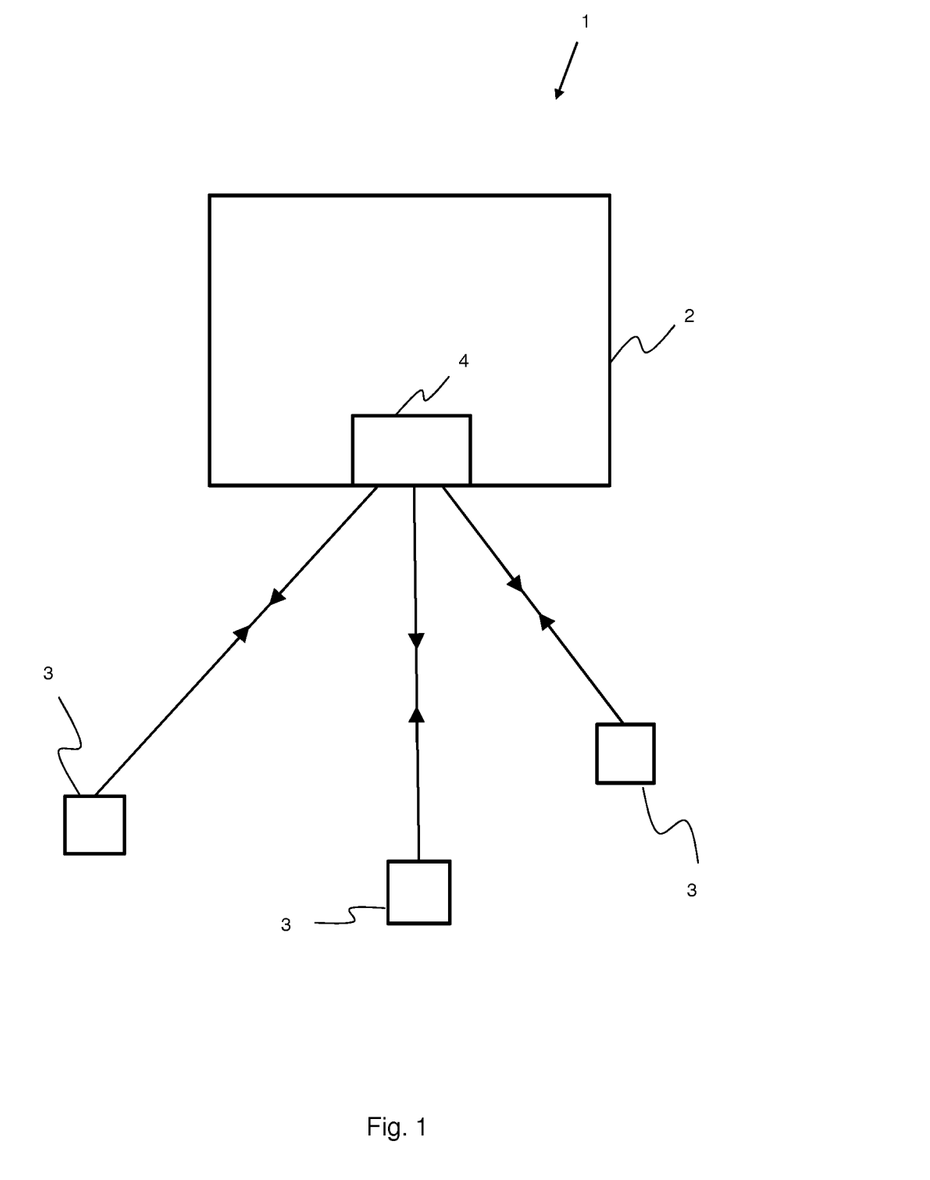
FIG. 1 is a schematic representation of a wireless LAN for use in accordance with embodiments of the disclosure.

FIG. 1 shows a wireless LAN which is indicated generally at 1. The LAN 1 contains an access point 2 and several clients 3. The access point 2 contains a single radio 4 for communicating with the clients 3. The radio 4 is capable of operating on several different frequencies within the frequency band of operation of the access point 2. For example, if the 2.4 GHz band is the band of operation, the radio 4 can operate on any of channels 1-13 within that band of operation.

Figure 2:
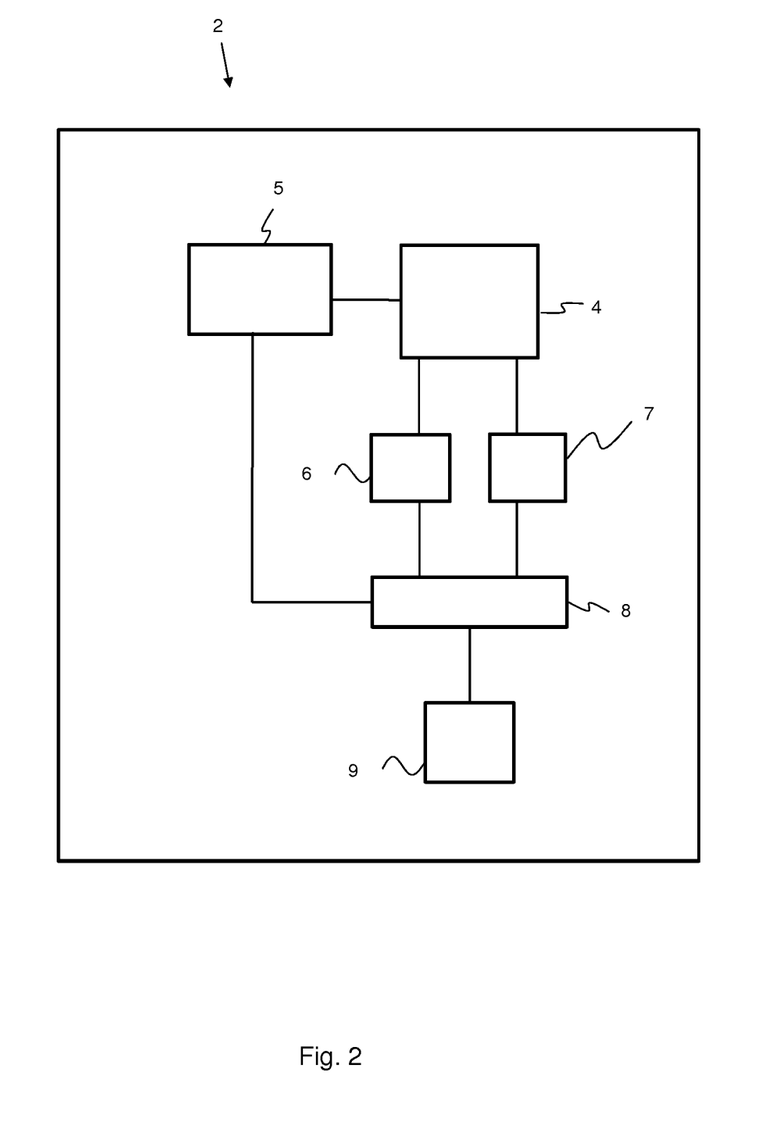
FIG. 2 is a schematic representation of wireless access point for use in accordance with embodiments of the disclosure.
Figure 3:
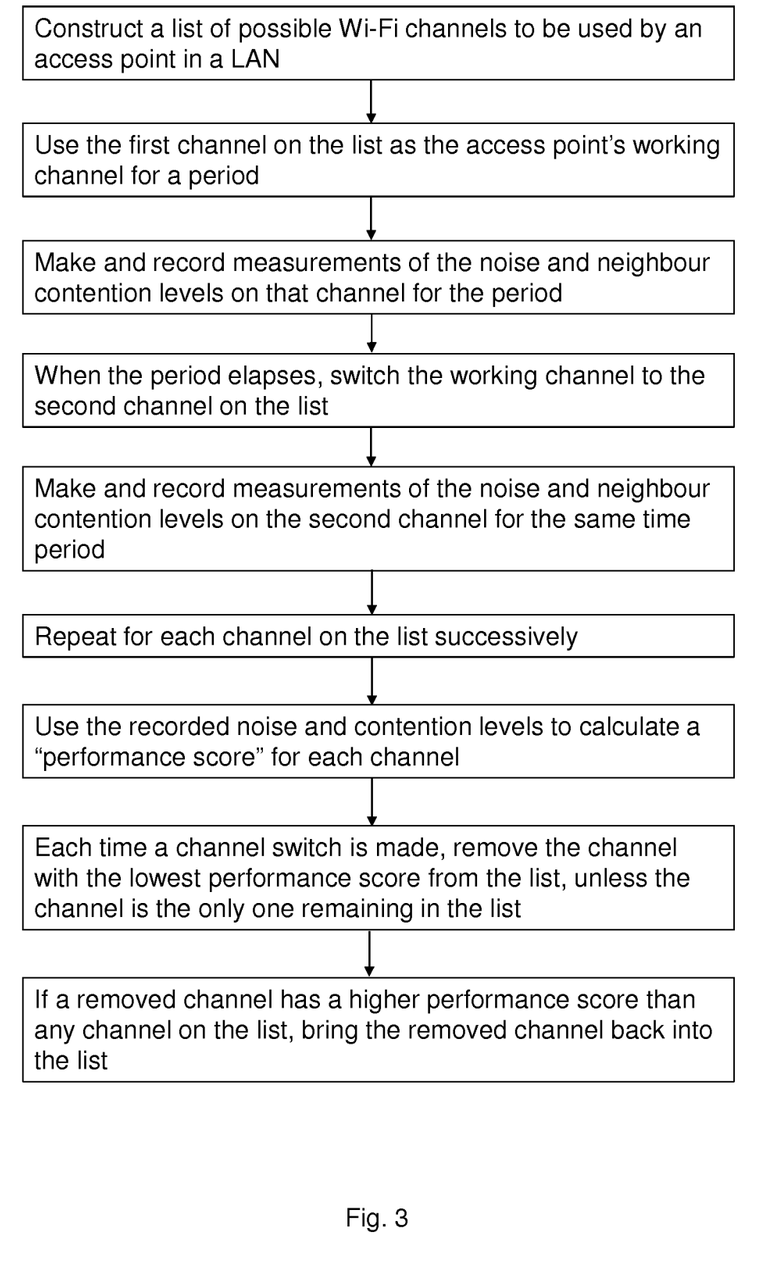
FIG. 3 is a flow chart showing a method in accordance with embodiments of the disclosure.

FIG. 2 shows the access point in more detail. A channel selector 5 is provided which assembles a channel cycle list (not shown). The channel cycle list is a list of candidate channels which can be used by the access point 2. The channel cycle list contains channels 1-13 within the 2.4 GHz band of operation. A measurement period timer is provided (not shown). The channel selector 5 sets this timer to a measurement period of one week and starts the timer running. The channel selector 5 then causes the radio 4 to use the first channel in the channel cycle list as the working channel for communication with the clients 3, for a period of one week.

There is also provided a noise level collector 6 and a contention level collector 7. During the period of one week that the first channel on the channel cycle list is used as the working channel, the noise level collector 6 and the contention level collector 7 measure the levels of noise and neighbor contention on the channel, respectively. By noise level it is meant the amount of interference (e.g. from microwave ovens, analogue TV senders, etc.) experienced by the working channel. Measuring the noise level involves measuring the signal to noise ratio associated with the channel. By contention level it is meant the amount of contending neighboring Wi-Fi traffic that is operating on the working channel. Measuring the noise level involves measuring the number of other access points located in the vicinity of the access point 2 that are operating on the channel. The noise 6 and contention level 7 collectors determine the average noise and contention levels over the course of each minute and record the averaged value in a channel performance store 8. Therefore, for example, the noise level collector 6 records 60 different values of the noise level in the channel performance store 8 each hour. Similarly, the contention level collector 7 records 60 different values of the contention level in the channel performance store each hour.

A channel score generator 9 is provided which generates a performance score for the working channel. It does this by determining the percentage of one minute intervals (where measurements exist) where noise level exceeds a predetermined noise threshold. This is referred to as the "noise score". It also determines the percentage of one minute intervals (where measurements exist) where contention level exceeds a predetermined contention threshold. This is referred to as the "contention score". It also determines the percentage of one minute intervals of the channel measurement period for which no measurements have yet been made. This is referred to as the "no measurement score". The channel score generator 9 calculates the channel performance score using the formula:

Channel Performance Score=100−max(noise score, contention score,no measurement score)

where "max (noise score, contention score, no measurement score)" means whichever is largest of the noise score, the contention score and the no measurement score.

The channel score generator 9 then stores the generated performance score in the performance store. Each time a new value for the noise and contention level is stored (i.e., every minute), the performance score generator 9 generates a new performance score for the working channel which takes into account the new values for the noise and contention levels. Therefore an updated performance score is generated and stored every minute.

When the measurement period timer indicates that the channel measurement period has elapsed, the channel selector 5 causes the working channel of the access point 2 to change to the next channel in the channel cycle list. As before, the noise and contention level collectors 6, 7 collect noise and contention levels on the new working channel, average them over the course of one minute and store the averaged values in the channel performance store 8. As before, the performance score generator 9 uses the noise and contention values to generate a performance score for the new working channel and updates the performance score each time new noise and contention values are stored. Once the measurement period expires, the working channel changes to the next channel in the channel cycle list and the process is repeated. This continues until all of the channels in the channel cycle list have been used as the working channel.

If, at any time, the channel performance score for the working channel falls below a predetermined unworkability threshold (i.e., if the performance of the channel is so poor as to be deemed unworkable), then the channel selector 5 causes the working channel to change to the next channel in the channel cycle list regardless of whether the channel measurement period has elapsed.

Once all of the channels have been used as the working channel, the channel selector 5 compares the stored performance scores for all of the channels. The channel with the lowest performance score is removed from the channel cycle list, unless it is the last remaining channel in the channel cycle list, it which case it is not removed from the channel cycle list. The channel selector 5 then causes the access point 2 to operate on the first channel remaining in the channel cycle list and the whole process restarts. When the channel selector 5 compares the stored performance scores for all of the channels, this includes the stored performance scores of channels that have previously been removed from the channel cycle list for having the lowest performance score on a particular cycle. If, when the performance scores of all the channels are compared, it transpires that a previously removed channel has a higher performance score than any channel presently on the channel cycle list, that previously removed channel is brought back into the channel cycle list.

The invention claimed is:

1. A method of selecting a channel for wireless communication in a WLAN, the method comprising:
    communicating data over a first communication channel between an access point having a single radio and a client device for a first time period;
    during the first time period, obtaining a first performance measurement indicative of performance of the first channel without pausing the data being communicated over the first communication channel;
    communicating data over a second communication channel between the access point and the client device for a second time period distinct from the first time period;
    during the second time period, obtaining a second performance measurement indicative of performance of the second channel without pausing the data being communicated over the second communication channel;
    ranking the first communication channel and the second communication channel in order of performance while taking the first performance measurement and the second performance measurement into account; and,
    selecting an operating channel using an outcome of the ranking.

2. The method as claimed in claim 1, further comprising obtaining a plurality of first performance measurements during the first time period.

3. The method as claimed in claim 2, wherein the plurality of first performance measurements includes one or more measurements of noise on the first channel.

4. The method as claimed in claim 2, wherein the plurality of first performance measurements includes one or more measurements of a contention level on the first channel.

5. The method as claimed in claim 1, further comprising obtaining a plurality of second performance measurements during the second time period.

6. The method as claimed in claim 1, wherein the second time period begins immediately after the first time period ends.

7. The method as claimed in claim 1, further comprising dividing the first time period into sub-periods and, for each sub-period, calculating an average value of two or more first performance measurements which were obtained during that sub-period.

8. The method as claimed in claim 7, wherein the sub-periods are of uniform duration.

9. The method as claimed in claim 1, further comprising dividing the second time period into sub-periods and, for each sub-period, calculating an average value of two or more second performance measurements which were obtained during that sub-period.

10. The method as claimed in claim 9, wherein the sub-periods are of uniform duration.

11. The method as claimed in claim 1, wherein the generated first performance values are stored in a data store.

12. The method as claimed in claim 11, wherein the data store is located in the access point.

13. The method as claimed in claim 1, wherein if the generated first performance value indicates that the performance of the first channel has fallen below an unworkability threshold, the first channel is replaced as the operating channel before the end of the first time period.

14. The method as claimed in claim 1, wherein the first period and the second period are of uniform duration.

15. An access point for a wireless communication network, the access point comprising:

a single transceiver adapted to communicate data between the access point and a client device over a first communication channel for a first time period, the transceiver being further adapted to communicate data between the access point and the client device over a second communication channel for a second time period distinct from the first time period;

a performance measurer adapted to measure performance of the first channel during the first time period without pausing the data being communicated over the first channel and further adapted to measure performance of the second channel during the second time period without pausing the data being communicated over the second channel;

channel ranking means adapted to rank the first channel and the second channel using the measurements made by the performance measurer; and a channel selector adapted to use an output of the channel ranking means to select an operating channel for the access point.

16. The access point as claimed in claim 15, wherein the access point is provided with a single radio.

* * * * *